(12) United States Patent
Tsujimura et al.

(10) Patent No.: US 7,705,895 B2
(45) Date of Patent: Apr. 27, 2010

(54) IMAGE TAKING APPARATUS AND IMAGE-TAKING METHOD

(75) Inventors: Takashi Tsujimura, Tokyo (JP); Takuro Enomoto, Kanagawa (JP); Yutaka Yoneda, Kanagawa (JP); Masatsugu Fukunaga, Kanagawa (JP); Daisuke Miyakoshi, Kanagawa (JP); Nobuho Ikeda, Tokyo (JP); Manabu Kubo, Tokyo (JP)

(73) Assignee: Sony Corporation (JP)

( * ) Notice: Subject to any disclaimer, the term of this patent is extended or adjusted under 35 U.S.C. 154(b) by 523 days.

(21) Appl. No.: 11/629,927

(22) PCT Filed: Apr. 3, 2006

(86) PCT No.: PCT/JP2006/007036

§ 371 (c)(1),
(2), (4) Date: Dec. 18, 2006

(87) PCT Pub. No.: WO2006/120814

PCT Pub. Date: Nov. 16, 2006

(65) Prior Publication Data

US 2008/0049121 A1  Feb. 28, 2008

(30) Foreign Application Priority Data

May 11, 2005  (JP) .............................. 2005-138200

(51) Int. Cl.
*H04N 5/76* (2006.01)
(52) U.S. Cl. .............................. 348/231.99; 348/231.6; 348/231.9
(58) Field of Classification Search ......... 348/294–324, 348/231.6, 231.9, 222.1, 231.99
See application file for complete search history.

(56) References Cited

U.S. PATENT DOCUMENTS

| 5,883,670 | A | * | 3/1999 | Sporer et al. | ............ 375/240.25 |
| 6,018,363 | A | * | 1/2000 | Horii | ........................ 348/219.1 |
| 6,523,102 | B1 | * | 2/2003 | Dye et al. | .................... 711/170 |
| 6,636,639 | B1 | * | 10/2003 | Terashima | .................. 382/232 |
| 6,781,629 | B2 | * | 8/2004 | Ohnogi | .................. 348/333.01 |
| 7,158,183 | B1 | * | 1/2007 | Ohta | .......................... 348/364 |

(Continued)

FOREIGN PATENT DOCUMENTS

JP  08-088833 A  4/1996

(Continued)

*Primary Examiner*—Tuan Ho
*Assistant Examiner*—Don Nguyen
(74) *Attorney, Agent, or Firm*—Lerner, David, Littenberg, Krumholz & Mentlik, LLP (57) ABSTRACT

An image obtained as a result of an image-taking process carried out at a screen rate higher than a standard screen rate is stored in a recording medium in the contemporary video format. To put it more concretely, the image obtained as a result of an image-taking process is supplied at a first screen rate to first compression/coding means for carrying out a compression/coding process at the first screen rate and image data obtained as a result of the compression/coding process is temporarily stored in temporary storage means. After image data output by the first compression/coding means during a predetermined period of time is stored in the temporary storage means, decompression/decoding means reads out the image data from the temporary storage means at a second screen rate lower than the first screen rate, carries out a decompression/decoding process on the image data and stores a result of the decompression/decoding process in recording means.

5 Claims, 5 Drawing Sheets

U.S. PATENT DOCUMENTS

| | | |
|---|---|---|
| 7,292,274 B2 * | 11/2007 | Nakamura ................. 348/272 |
| 7,382,337 B2 * | 6/2008 | Yoo ............................ 345/60 |
| 2003/0011689 A1 * | 1/2003 | Shioji ..................... 348/231.6 |
| 2004/0022521 A1 | 2/2004 | Kishi et al. |
| 2005/0093982 A1 * | 5/2005 | Kuroki ................. 348/207.99 |
| 2005/0146608 A1 * | 7/2005 | Yosida et al. ........... 348/207.1 |
| 2006/0082824 A1 * | 4/2006 | Maeda ..................... 358/1.15 |
| 2006/0192860 A1 * | 8/2006 | Atsumi et al. ............ 348/222.1 |
| 2006/0244735 A1 * | 11/2006 | Wilson ....................... 345/173 |

FOREIGN PATENT DOCUMENTS

| | | |
|---|---|---|
| JP | 08-251492 A | 9/1996 |
| JP | 2001-359038 A | 12/2001 |
| JP | 2004-040518 A | 2/2004 |
| JP | 2004-129217 A | 4/2004 |
| JP | 2004-266373 A | 9/2004 |
| JP | 2005-006198 A | 1/2005 |

* cited by examiner

IMAGE TAKING APPARATUS AND IMAGE-TAKING METHOD

TECHNICAL FIELD

The present invention relates to an image-taking apparatus and an image-taking method. More particularly, the present invention relates to an image-taking apparatus and an image-taking method, which are used for taking an image by using a solid-state image-taking device.

BACKGROUND ART

In recent years, accompanying severer and severer competition between image-taking apparatus represented by digital cameras, in the field of image-taking apparatus for consumer applications, there are demands for better qualities, larger-scale integrations and more advanced functions. For this reason, special functions provided for only business applications so far have also started becoming popular in the consumer applications. A representative example of the special functions is a high-speed image-taking function for taking an image at an image-taking rate higher than a normal rate.

In the conventional image-taking apparatus, the size of an image to be processed at a high rate is converted into a small size such as ¼ of the standard image size and 4 images each having such a small size are embedded in an image of the standard rate in order to realize a high-speed image process (for example, refer to Patent Document 1). In addition, by adoption of a circuit structure for processing data from a sensor in parallel, the amount of image data processed per time unit can be increased in order to implement the high-speed image process (for example, refer to Patent Document 2).

As shown in an invention described in Patent Document 1 cited above, however, for a standard-rate image recorded as a result of embedding a plurality of small-size images as explained above, in order to display small-size images one by one at reproduction process, specifications are required for data recording and reproduction processes. In consequence, there are problems such as a rising manufacturing cost and a lack of generality. In addition, as shown in an invention described in Patent Document 2 mentioned above, there are problems such as a rising cost to manufacture the circuit for parallel processing and lost portability.

[Patent Document 1] Japanese Patent Laid-open No. Hei 8-88833 (Paragraph numbers [0011] to [0014] and FIG. 1).

[Patent Document 2] Japanese Patent Laid-open No. Hei 8-251492 (Paragraph numbers [0018] to [0027] and FIG. 1).

DISCLOSURE OF THE INVENTION

It is thus an object of the present invention, which addresses the problems described above, to provide a low-cost image-taking apparatus capable of storing an image taken at a screen rate higher than a standard rate in the contemporary video format.

In addition, it is another object of the present invention to provide an image-taking method capable of storing an image, which has been taken at a screen rate higher than a standard rate in the contemporary video format, at a low cost.

In order to solve the problems described above, in accordance with the present invention, there is provided an image-taking apparatus for taking an image by using a solid-state image-taking device. The image-taking apparatus is characterized in that the apparatus includes:

first compression/coding means for receiving the data of an image, which has been taken in an image-taking process at a first screen rate, and carrying out a compression/coding process on the image;

temporary storage means for temporarily storing the data of an image obtained as a result of a compression/coding process carried out by the first compression/coding means;

decompression/decoding means for reading out the data of an image taken during a predetermined period of time from the temporary storage means at a second screen rate lower than the first screen rate and carrying out a decompression/decoding process on the image read out from the temporary storage means;

second compression/coding means for carrying out a compression/coding process on an image obtained as a result of the decompression/decoding process carried out by the decompression/decoding means; and storage means for storing the data of an image obtained as a result of a compression/coding process carried out by the second compression/coding means.

In accordance with the image-taking apparatus described above:

the first compression/coding means receives data of an image, which has been taken in an image-taking process at a first screen rate, and carries out a compression/coding process on the image;

the temporary storage means is used for temporarily storing the data of an image obtained as a result of a compression/coding process carried out by the first compression/coding means;

the decompression/decoding means reads out the data of an image taken and stored temporarily in the temporary storage means during a predetermined period of time from the temporary storage means at a second screen rate lower than the first screen rate and carries out a decompression/decoding process on the image read out from the temporary storage means;

the second compression/coding means carries out a compression/coding process on an image obtained as a result of a decompression/decoding process carried out by the decompression/decoding means; and the storage means is used for storing the data of an image obtained as a result of a compression/coding process carried out by the second compression/coding means.

If the second screen rate is the contemporary standard rate, for example, the data of an image taken in an image-taking process can be obtained at a screen rate higher than the standard rate. Thus, even if the data of such an image is supplied to the first compression/coding means at the high-speed screen rate, the second compression/coding means carries out a compression/coding process on an image obtained as a result of a decompression/decoding process carried out by the decompression/decoding means at the standard rate, and the storage means is used for storing the data of an image obtained as a result of the compression/coding process carried out by the second compression/coding means.

That is to say, in accordance with the image-taking apparatus provided by the present invention, if the data of an image is supplied to the first compression/coding means at the first screen rate, the second compression/coding means carries out a compression/coding process on an image obtained as a result of a decompression/decoding process, which is carried out by the decompression/decoding means, at the second screen rate lower than the first screen rate, and the storage means is used for storing the data of an image obtained as a result of the compression/coding process carried out by the second compression/coding means. If the second screen rate is the contemporary standard rate, for example, the data of an image taken in an image-taking process can be obtained at a screen rate higher than the standard rate. Thus, even in the case of such an image, the existing circuits can be used as the decompression/decoding means and the storage means. In addition, the storage means can be used for storing the data of an image in the contemporary video format conforming to the standard rate. On top of that, the first compression/coding means receives data of an image, which has been taken in an image-taking process at a first screen rate, and carries out a compression/coding process on the image whereas the temporary storage means is used for temporarily storing the data of an image obtained as a result of the compression/coding process carried out by the first compression/coding means. Thus, the storage capacity of the storage means can be reduced. As a result, it is possible to prevent the cost of manufacturing the image-taking apparatus from rising and to store the data of an image taken at a screen rate higher than the standard rate in the contemporary video format.

BEST MODE FOR CARRYING OUT THE INVENTION

An embodiment of the present invention is explained by referring to diagrams as follows.

Figure 1:
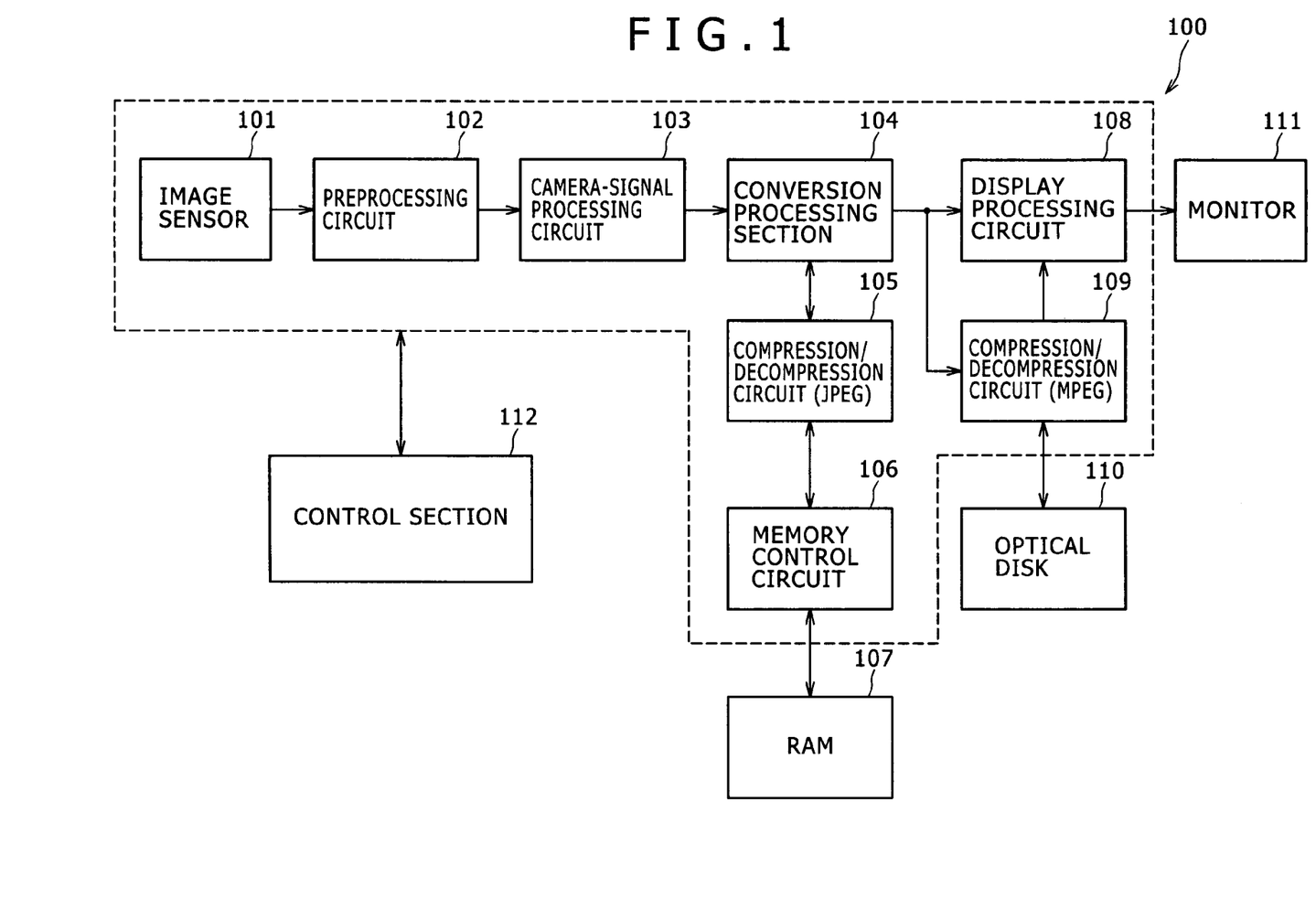
FIG. 1 is a diagram showing a typical system configuration of an image-taking apparatus according to an embodiment.

FIG. 1 is a diagram showing a typical system configuration of an image-taking apparatus 100 according to the embodiment. The image-taking apparatus 100 shown in FIG. 1 includes an image sensor 101, a preprocessing circuit 102, a camera-signal processing circuit 103, a conversion processing section 104, compression/decompression circuits 105 and 109, a memory control circuit 106, a RAM 107, a display processing circuit 108, an optical disk 110, a monitor 111 and a control section 112.

The image sensor 101 is a unit for carrying out a photoelectric conversion process to convert a light beam generated by an object of photographing and received by components including a lens unit employed in the image-taking apparatus 100 into an electrical signal. The image sensor 101 is typically an image-taking device of a CMOS (Complementary Metal Oxide Semiconductor) type. The image sensor 101 has an embedded sample hold function of carrying out a CDS (Correlated Double Sampling) process in order to sustain a good S/N (Signal/Noise) ratio.

The image sensor 101 is capable of reading out a signal at a high speed, i.e., at a rate of at least 60 fps (fields/second) described in the specifications of an NTSC system. For example, in a high-speed screen rate mode to read out a signal at a high speed, the image sensor 101 typically reads out the signal at a 240-fps rate, which is four times a standard rate.

The image sensor 101 also has a function to reduce the size of an image without changing the field angle, that is, a function to decrease the amount of image data per frame. The image sensor 101 executes the function by summing up signals of adjacent pixels having the same color in a two-dimensional pixel matrix of the image-taking device to produce a sum signal and outputting the sum signal at the same time for example in a process to output pixel signals of one line. By carrying out such a pixel addition process, it is possible to increase an image switching rate without raising the frequency to read out pixel signals. It is to be noted that, by adjusting the number of pixels subjected to the pixel addition process, it is possible to output image signals at any arbitrary screen rate.

The preprocessing circuit 102 is a circuit for controlling the gain of an image signal output by the image sensor 101 by carrying out an AGC (Auto Gain Control) process. The preprocessing circuit 102 then carries out an A/D conversion process to convert the input analog image signal into an output digital image signal. The camera-signal processing circuit 103 is a circuit for carrying out camera-signal processing on an image signal output by the preprocessing circuit 102. The camera-signal processing includes a white-balance adjustment process, a color correction process, an AF (Auto Focus) process and an AE (Auto Exposure) process. It is to be noted that, in a high-speed screen rate mode, the resolution of an image signal output by the image sensor 101 is lower than the resolution of a standard rate mode. Thus, the preprocessing circuit 102 and the camera-signal processing circuit 103 are capable of processing an image signal without increasing the operating frequency.

The conversion processing section 104 is a section for carrying out a size adjustment process and a display discrete reduction process on an image signal received from the camera-signal processing circuit 103. In addition, the conversion processing section 104 also carries out a size adjustment process on an image signal received from the compression/decompression circuit 105. It is to be noted that the display discrete reduction process is carried out only in order to output a signal to display processing circuit 108. The display discrete reduction process is a process to discretely eliminate excessive fields in order to adjust the number of fields per time unit to a field count (in this case, the number of fields per time unit is 60 fps) prescribed in display specifications of a display unit employed by the image-taking apparatus 100 to show an image taken in the high-speed screen rate mode. In the adjustment of the size of an image signal output by the camera-signal processing circuit 103, the conversion processing section 104 is capable of carrying out different size adjustment processes in order to output a signal to the compression/decompression circuit 105 and another signal to the display processing circuit 108.

The compression/decompression circuit 105 is a circuit for carrying out a compression/coding process on an image signal received from the conversion processing section 104 by adoption of a still-image encoding method such as a JPEG (Joint Photographic Experts Group) method. In addition, the compression/decompression circuit 105 also carries out a decompression/decoding process on the coded data of a still signal received from the memory control circuit 106. The memory control circuit 106 is a circuit for controlling operations to read out image data from the RAM 107 and write image data into the RAM 107. The RAM 107 is a memory used for temporarily storing image data received from the memory control circuit 106 by adoption of a FIFO (First In First Out) method. Typically, the RAM 107 is an SDRAM (Synchronous Dynamic Random Access Memory).

The display processing circuit 108 is a circuit for generating an image signal to be displayed on the monitor 111 from an image signal supplied by the conversion processing section 104 or the compression/decompression circuit 109. The display processing circuit 108 supplies the generated image signal to the monitor 111 for displaying an image represented by the signal. The monitor 111 is typically an LCD (Liquid Crystal Display) unit. The monitor 111 is a section for displaying a camera-through image being taken or an image obtained as a result of a process to reproduce data from the optical disk 110.

The compression/decompression circuit 109 is a circuit for carrying out a compression/coding process on an image signal received from the conversion processing section 104 by adoption of a moving-picture encoding method such as a MPEG (Moving Picture Experts Group) method. In addition, the compression/decompression circuit 109 also carries out a decompression/decoding process on the coded data of a moving picture received from the optical disk 110 and outputs the result of the decompression/decoding process to the display processing circuit 108. The monitor 111 is a section for displaying a moving picture from the display processing circuit 108. It is to be noted that the monitor 111 can be provided externally to the image-taking apparatus 100 or, as an alternative, an interface for outputting a signal to an external apparatus can be provided in the image-taking apparatus 100 as a substitute for the monitor 111.

The control section 112 is a microcontroller including a CPU (Central Processing Unit), a ROM (Read Only Memory) and a RAM (Random Access Memory). The CPU is a unit for executing programs stored in the ROM or the like in order to control the other components of the image-taking apparatus in a coordinated manner.

It is to be noted that recording media used for storing image data obtained as a result of the compression/coding process adopting the MPEG method is not limited to the optical disk 110. For example, the recording media can also be a magnetic tape, a semiconductor memory such as a flash memory, an HDD or the like. The recording media is basically a recording media that can be mounted on or removed from the image-taking apparatus 100. In place of the recording media that can be mounted on or removed from the image-taking apparatus 100, it is also possible to employ an irremovable recording media, with which data can be exchanged by way of a communication interface.

Figure 2:
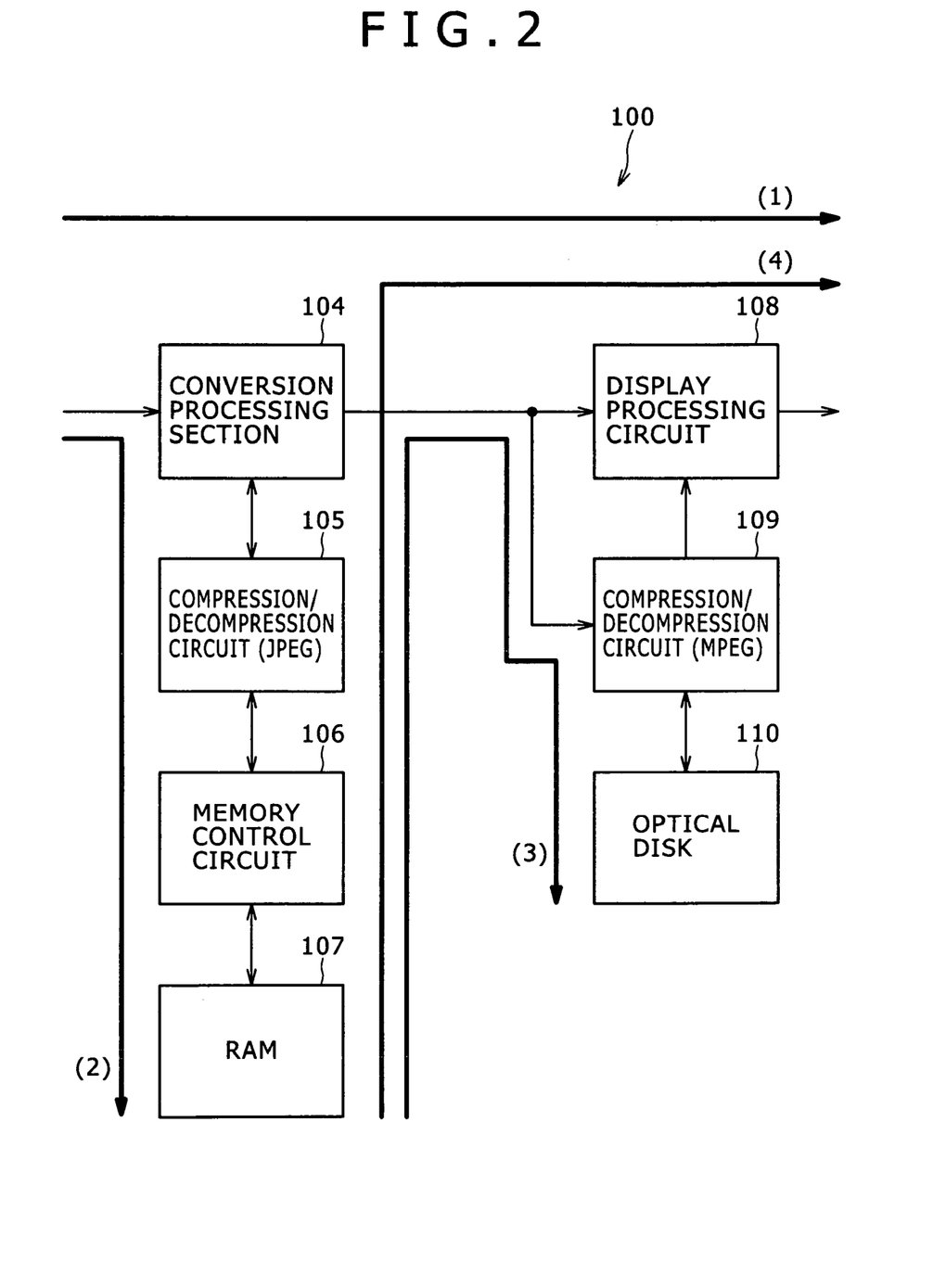
FIG. 2 is a diagram showing flows of data in a high-speed screen rate mode.

FIG. 2 is a diagram showing flows of data in a high-speed screen rate mode. Functional blocks shown in FIG. 2 are a portion of blocks shown in FIG. 1 as the blocks of the typical configuration of the image-taking apparatus 100.

It is to be noted that each arrow shown as a bold line represents a flow of data. In the following description, processes are explained in terms of the arrows, which are each denoted by a reference numeral.

[Flow (1)] The conversion processing section 104 carries out a process on an image signal output by the camera-signal processing circuit 103 at a field count of 240 fps in order to reduce the count to 60 fps prescribed in the NTSC specifications and supply an image signal obtained as a result of the process to the display processing circuit 108. To put it concretely, the conversion processing section 104 discretely eliminates excessive fields in order to reduce the number of fields per time unit to ¼. Then, the display processing circuit 108 generates an image signal to be displayed on the monitor 111 from the image signal supplied by the conversion processing section 104, and supplies the generated image signal to the monitor 111 for displaying an image represented by the signal.

[Flow (2)] When the conversion processing section 104 receives a request made by the control section 112 as a request to start a process to record an image, which is taken at a high speed, in accordance with an operation carried out by the user, the conversion processing section 104 transfers an image signal representing an image with an adjusted size to the compression/decompression circuit 105. At that time, no discrete reduction process is carried out on the image signal. To be more specific, the conversion processing section 104 changes the size of the image represented by the image signal received from the camera-signal processing circuit 103 to typically 512 pixels×192 pixels and, then, transfers the image signal representing the image with the adjusted size to the compression/decompression circuit 105. The size of the image is adjusted to conform to specifications of the compression/decompression circuit 105 and the RAM 107.

When the compression/decompression circuit 105 receives the image signal from the conversion processing section 104, the compression/decompression circuit 105 carries out a compression/coding process adopting the JPEG method on the signal to generate coded data in accordance with a command received from the control section 112. Then, the memory control circuit 106 temporarily stores the coded data received from the compression/decompression circuit 105 in the RAM 107. In this way, the RAM 107 accumulates image data produced during a predetermined period of time.

[Flow (3)] When the memory control circuit 106 receives a request to read out coded data stored temporarily in the RAM 107 from the control section 112, the memory control circuit 106 reads out the coded data from the RAM 107 at rate of 60 fps and supplies the data to the compression/decompression circuit 105. The compression/decompression circuit 105 carries out a decompression/decoding process on the coded data received from the memory control circuit 106 and supplies a result of the process to the conversion processing section 104. In accordance with a request received from the control section 112 as a request to record data onto the optical disk 110, the conversion processing section 104 supplies the image signal received from the compression/decompression circuit 105 as a result of the decompression/decoding process to the compression/decompression circuit 109. The compression/decompression circuit 109 converts the image signal received from the conversion processing section 104 into a moving picture having the MPEG format and stores the picture onto the optical disk 110.

[Flow (4)] The conversion processing section 104 adjusts the size of an image represented by the image signal received from the compression/decompression circuit 105 at the rate of 60 fps and supplies an image signal representing an image with an adjusted size to the display processing circuit 108. It is to be noted that, in flow (4), the data outputted from the conversion processing section 104 in flow (3) may be concurrently outputted to the display processing circuit 108.

There are many components each implemented by a contemporary circuit operating at the standard rate in the processes described above. Examples of the components are the compression/decompression circuit 109 and the display processing circuit 108. In addition, image data can be recorded onto the optical disk 110 in the contemporary video format, which conforms to the standard rate. On top of that, the compression/decompression circuit 105 reduces the amount of data to be stored in the RAM 107 so that a RAM 107 with a small storage capacity can be employed.

Figure 3:
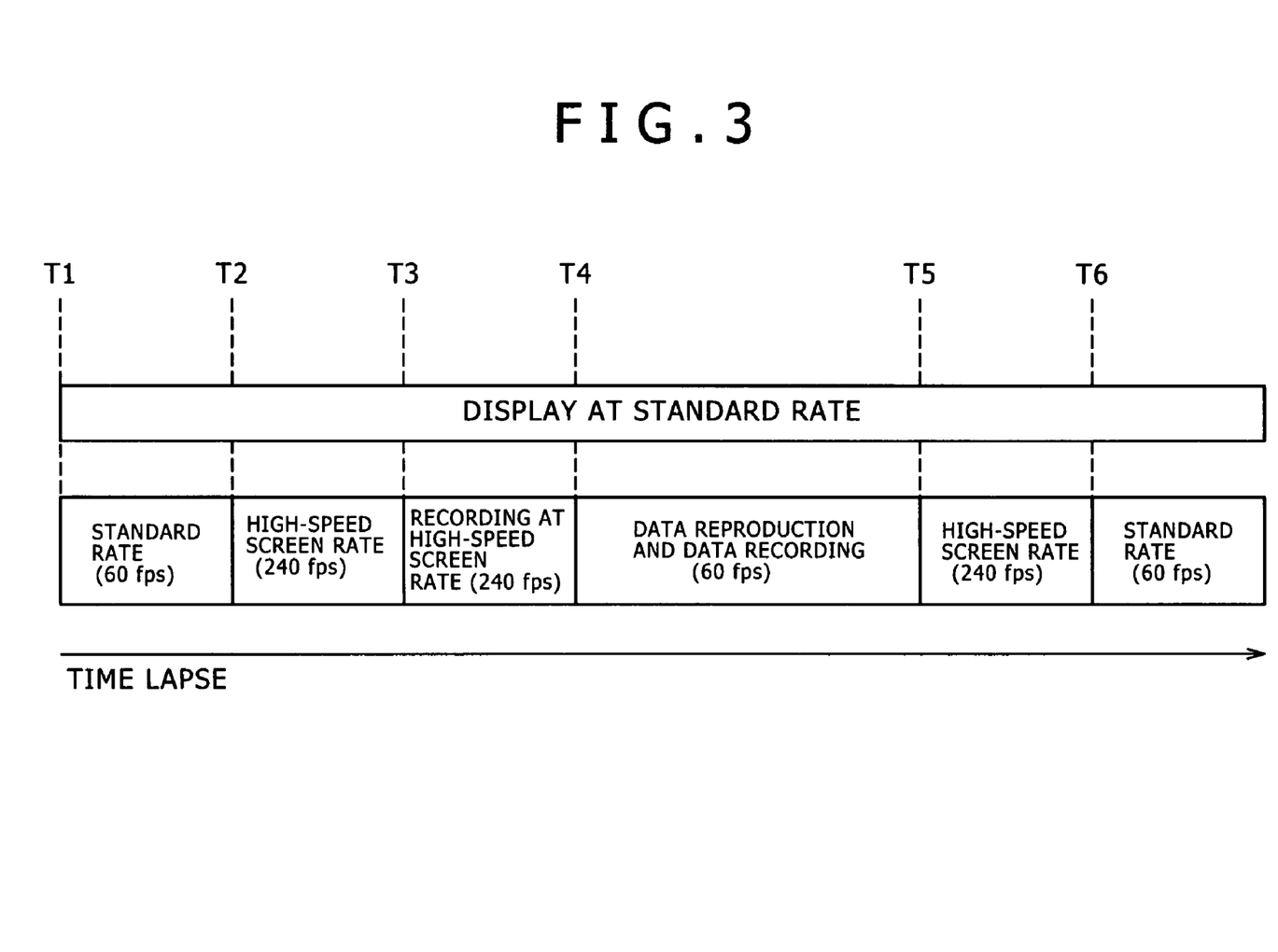
FIG. 3 shows timing charts of typical operations carried out by the image-taking apparatus according to the embodiment.

FIG. 3 shows timing charts of typical operations carried out by the image-taking apparatus according to the embodiment.

[Time T1] When the power supply is turned on, the image-taking apparatus 100 is activated to operate in a standard-rate mode. It is to be noted that, in the standard-rate mode, an image signal taken at a rate of 60 fps is supplied from the camera-signal processing circuit 103 to the display processing circuit 108 by way of the conversion processing section 104. Thus, a camera-through image is displayed on the monitor 111. In addition, if an image has been taken, a 60-fps signal representing the image is supplied from the camera-signal processing circuit 103 to the compression/decompression circuit 109 by way of the conversion processing section 104. The compression/decompression circuit 109 carries out a compression/coding process adopting the MPEG method on the image signal and records a result of the process onto the optical disk 110.

[Time T2] The user carries out an operation to enter a request to the image-taking apparatus 100 as a request to change the standard-rate mode to a high-speed screen rate mode. In accordance with the request, the control section 112 issues a command to change the standard-rate mode to the high-speed screen rate mode. During the period T2 to T4, data flows in accordance with flow (1) shown in FIG. 2.

[Time T3] The user carries out an operation to enter a request to the image-taking apparatus 100 as a request to start a process to temporarily record data into the RAM 107 at a high-speed screen rate of 240 fps. At that time, data flows in accordance with flow (2) shown in FIG. 2. Thus, pieces of data flow in accordance with both flow (1) and flow (2).

[Time T4] As the RAM 107 becomes full of image data stored therein, the image-taking apparatus 100 automatically stops the photographing and recording processes at the high-speed screen rate and carries out processes to reproduce data from the RAM 107 and records the data onto the optical disk 110. To put it in detail, the image data stored in the RAM 107 is read out at a rate of 60 fps and supplied to the compression/decompression circuit 105. The compression/decompression circuit 105 carries out a decompression/decoding process on the image data and supplies a result of the process to the conversion processing section 104. The conversion processing section 104 outputs an image signal to the compression/decompression circuit 109, which carries out a compression/coding process adopting the MPEG method on the image signal and records a result of the process onto the optical disk 110. At the same time, the conversion processing section 104 also outputs the image signal to the display processing circuit 108 concurrently with the process to output the image signal to the compression/decompression circuit 109 in order to display a moving picture on the monitor 111. At that time, the image data can be output at a rate of 60 fps without discretely reducing the image data obtained as a result of the photographing operation at a rate of 240 fps. That is to say, a slow reproduction process is carried out at a speed equal to ¼ of the speed of the photographing process. For example that the period T3 to T4 is three seconds. In this case, 720 frames are obtained as a result of the photographing operation during the three second period T3 to T4 and stored in the RAM 107. Then, in the reproduction process to reproduce data from the RAM 107, the data is output at the standard rate of 60 fps. Thus, the period T4 to T5 with a length of 12 seconds is four times the photographing period. When the process to reproduce data from the RAM 107 and the process to record data onto the optical disk 110 are started, data flows (1) and (2) shown in FIG. 2 are ended to enter the states of both data flows (1) and (2).

[Time T5] The image-taking apparatus 100 ends the process to reproduce data from the RAM 107 and the process to record data onto the optical disk 110. At time T5, the image-taking apparatus 100 enters a state of waiting for a photographing operation to be carried out at the high-speed screen rate. At that time, data flows (4) and (5) shown in FIG. 2 are ended while data starts to flow in accordance with flow (1).

[Time T6] The user carries out an operation to enter a request to the image-taking apparatus 100 as a request to change the mode to the standard-rate mode. In accordance with this request, the image-taking apparatus 100 changes the mode to the standard-rate mode.

As described above, in the image-taking apparatus 100 according to the embodiment, image data obtained as a result of an image-taking process carried out in a high-speed screen rate mode is accumulated temporarily in the RAM 107 with the high-speed screen rate kept as it is. Then, the image data is read out from the RAM 107 at the standard rate (60 fps) and recorded onto the optical disk 110. For this reason, the compression/decompression circuit 109 as well as the circuit and mechanism of a recording process system for recording data onto the optical disk 110 can be made the same as those used at the standard rate. In addition, the manufacturing cost of the image-taking apparatus can be sustained at a low level. On top of that, in spite of the image-taking process carried out at the high-speed screen rate, image data can be encoded and recorded onto the optical disk 110 in the contemporary video format for the standard rate. It is to be noted that a recorded moving picture is subjected to a decompression/decoding process in the same way as the ordinary reproduction processing in the compression/decompression circuit 109 and the result of the decompression/decoding process can be supplied to the monitor 111 by way of the display processing circuit 108 in order to implement slow reproduction. In addition, the slow reproduction processing can also be carried out in the same way in another reproduction apparatus designed for the same video format.

On top of that, in the typical operations shown in FIG. 3, in a process to record taken image in the high-speed screen rate mode (during the predetermined period T4 to T5), image data obtained is stored temporarily in the RAM 107. Then, while a process to record the image data onto the optical disk 110 is being carried out, image data read out from the RAM 107 in a slow reproduction process can be visually confirmed by using the display processing circuit 108 so as to allow the user to verify the image data being recorded onto the optical disk 110. In addition, it is possible to provide a natural operation feeling to the user. On top of that, this process also proves that the display processing circuit 108 can have the same configuration as that used in the standard rate mode. Thus, a better effect of reducing the manufacturing cost can be obtained. In addition, also during the period T2 to T3 to arrange the field angle in the high-speed screen rate mode and the period T3 to T4 to store image data into the RAM 107, an image discretely reduced in the conversion processing section 104 is supplied to the display processing circuit 108 so as to allow the user to visually confirm the taken image by using the monitor 111 so that the user never loses the operation feeling. This process also proves that the display processing circuit 108 can have the same configuration as that used in the standard rate mode.

In addition, since the compression/decompression circuit 105 reduces the amount of the image data obtained in the high-speed screen rate mode and stores the data with a reduced amount into the RAM 107, the size of the RAM 107 can also be decreased so that the circuit scale and the manufacturing cost can be reduced as well. Thus, by adding a minimum number of circuits to the contemporary circuit and the contemporary mechanism, which are used for processing an image taken at the standard rate, the data taken at a screen rate higher than the standard rate can be recorded onto a recording medium in the contemporary video format. As a result, even though the size of the image-taking apparatus and the cost to manufacture the apparatus can be prevented from increasing, it is possible to provide the apparatus with a function, which gives convenience to the user and has a high added value.

The following description further explains the cost to manufacture a new circuit to be added to the existing circuit. A typical circuit for encoding a moving picture such as the compression/decompression circuit 109 is a circuit for processing the data of a moving picture at a fixed screen rate and a fixed resolution, which are prescribed in the specifications of the moving picture. Thus, in order to make the circuit capable of processing a moving picture at a screen rate higher than the standard rate in particular, the circuit must be developed and manufactured inevitably at a very high cost.

By the way, the resolution of the recent image-taking device shows a trend to exceed a resolution prescribed by the specifications of the moving picture, and there are a large number of circuits for encoding a still picture with such a high resolution. With each of such circuits, the processing speed can be raised for a case in which the resolution is decreased. Thus, by employing such a circuit for encoding a still picture as the compression/decompression circuit 105 for processing image data at a high-speed screen rate, the manufacturing cost can be reduced to a low level in comparison with a case in which the processing speed of an encoder for processing a moving picture is increased.

In addition, the image-taking apparatus 100 can also be made capable of recording the data of a still picture (JPEG data in this case) onto the optical disk 110 by employing the compression/decompression circuit 105 in addition to the data of a moving picture (MPEG data in this case). In the case of an image-taking apparatus capable of recording the compressed data of both a still picture and a moving picture onto a recording medium as described here, the apparatus is also capable of recording an image taken in the high-speed screen rate mode onto the optical disk 110 without modifying the circuit configuration.

Figure 4:
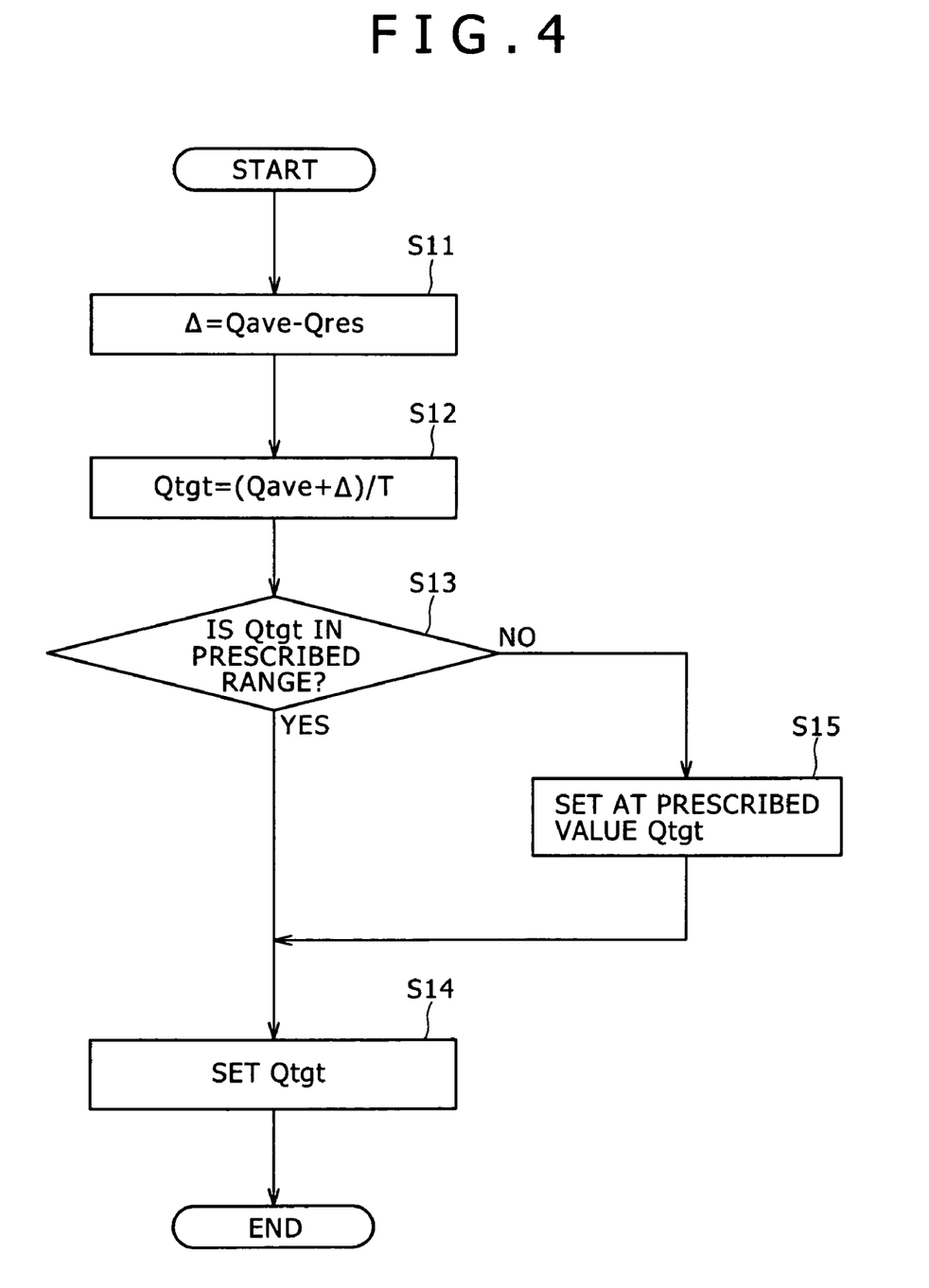
FIG. 4 shows a flowchart representing processing carried out by a control section during an image compression process performed by a compression/decompression circuit.

FIG. 4 shows a flowchart representing processing carried out by the control section 112 during an image compression process performed by the compression/decompression circuit 105. The processing is explained below in terms of steps, which are each denoted by a step number.

In execution of the processing, an initial value Qave of a quantization scale per piece of image data is found in advance and stored in typically a ROM of the control section 112. The initial value Qave is found so that the RAM 107 having a given storage capacity is just filled up with data accumulated therein as image data obtained according to a time to store the image data in a high-speed screen rate mode, a capacity of the RAM 107, screen rate, and a resolution used for processing the image data in the compression/decompression circuit 105.

[Step S11] The compression/decompression circuit 105 has a function to notify the control section 112 of a coding quantity Cres for each compression/coding process of coding image data of the coding quantity. The control section 112 finds a quantization scale value Qres on the basis of the coding quantity Cres received from the compression/decompression circuit 105 as the coding quantity Cres of an image signal for the preceding field. Then, the control section 112 finds the difference Δ between the quantization scale value Qres and a value held by the control section 112 as the initial value Qave of the quantization scale.

[Step S12] The difference Δ is added to the initial value Qave to produce a sum, which is then divided by a time constant T determined in advance in order to prevent the picture quality from changing abruptly when a compression/coding process is carried out on an image signal. The result of the division is used as a target quantization scale value Qtgt for the next image signal.

[Step S13] If a compression rate used in a compression/coding process carried out on an image signal is too high, the resulting coding quantity is small but the noise of the image is large. If the compression rate used in a compression/coding process carried out on an image signal is too low, on the other hand, the size of the resulting data size is large so that a moving picture obtained during a period of time corresponding to a desired number of seconds cannot be accumulated in the RAM 107. In order to solve this problem, a fixed range is set for the target quantization scale value Qtgt. The control section 112 determines as to whether or not the target quantization scale value Qtgt found in a process carried out at the step S12 falls within the fixed range. If the result of the determination indicates that the target quantization scale value Qtgt falls within the fixed range, the flow of the processing goes on to a step S14. If the result of the determination indicates that the target quantization scale value Qtgt does not fall within the fixed range, on the other hand, the flow of the processing goes on to a step S15.

[Step S14] The control section 112 sets target quantization scale value Qtgt to the compression/decompression circuit 105 and the compression/decompression circuit 105 executes compression/coding process.

[Step S15] If the target quantization scale value Qtgt does not fall within the fixed range determined in advance, the target quantization scale value Qtgt is set at a prescribed value. To put it concretely, if the result of the determination indicates that the target quantization scale value Qtgt exceeds the fixed range determined in advance, the target quantization scale value Qtgt is set at the upper limit of the range. If the result of the determination indicates that the target quantization scale value Qtgt is smaller than the fixed range, on the other hand, the target quantization scale value Qtgt is set at the lower limit of the range.

By carrying out the processing represented by the flowchart shown in FIG. 4, it is possible to record just as much image data as the storage quantity of the RAM 107 in the RAM 107 while minimizing deterioration of the picture quality of an image taken in the high-speed screen rate mode. This processing is generally carried out in the conventional apparatus such as an image-taking apparatus and a video recorder, which have a VBR (Variable Bit Rate) recording function for recording the data of a moving picture. By applying such a contemporary technology to the embodiment, it is possible to provide an effect of suppressing deterioration of the picture quality of an image taken in the high-speed screen rate mode at reduced development and manufacturing costs and an effect of decreasing the size of the RAM 107 and, hence, decreasing the circuit scale as well as the manufacturing cost.

By the way, in the embodiment described above, right after image data is stored in the RAM 107 at a high-speed screen rate, a process to reproduce the data and record the data onto the optical disk 110 is started. Instead of carrying out the process to record the data onto the optical disk 110 right after the process to store the data into the RAM 107, only a process to reproduce the data can be once performed and the data can then be recorded onto the optical disk 110 in accordance with a request made by the user. Timing charts of these operations are explained as follows.

Figure 5:
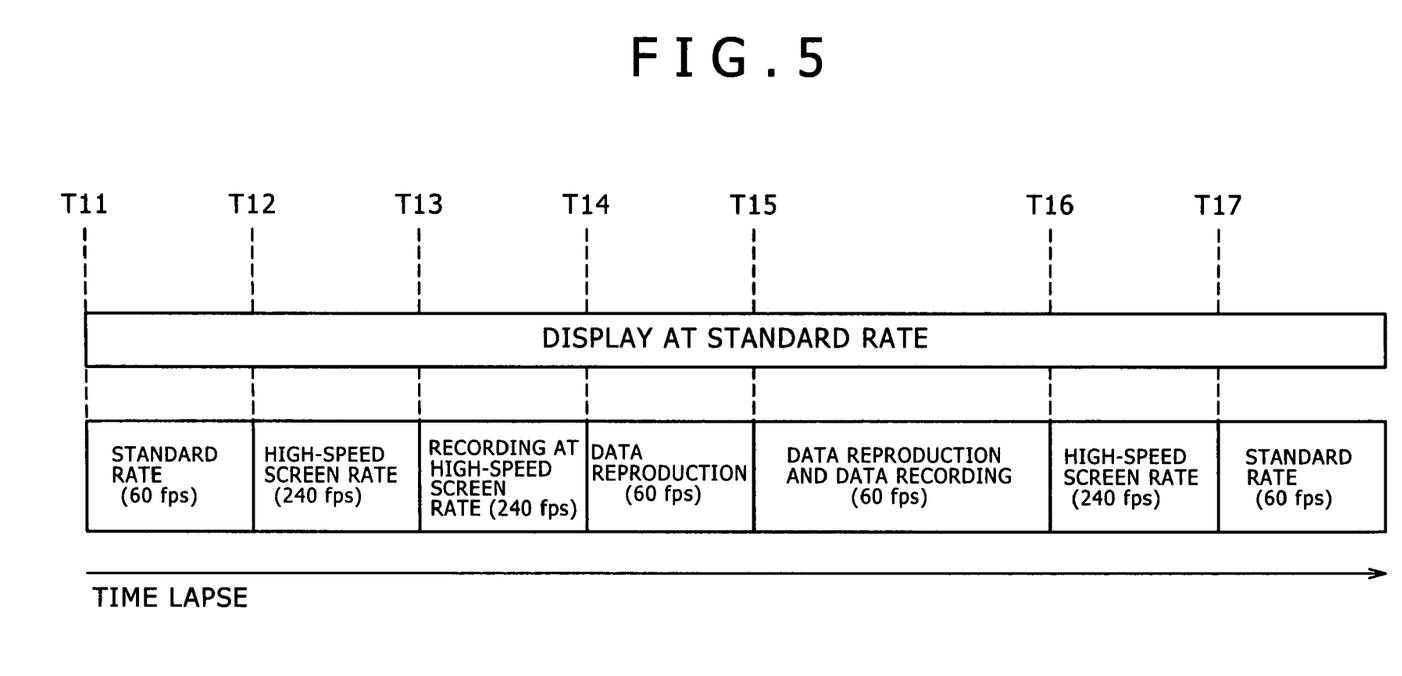
FIG. 5 shows timing charts of typical operations to once carry out a reproduction process only.

FIG. 5 shows timing charts of the typical operations to once carry out a reproduction process only as described above.

[Time T11] When the power supply is turned on, the image-taking apparatus 100 is activated to operate in a standard-rate mode.

[Time T12] The user carries out an operation to enter a request to the image-taking apparatus 100 as a request to change the standard-rate mode to a high-speed screen rate mode. In accordance with this request, the control section 112 issues a command to change the standard-rate mode to a high-speed screen rate mode. During the period T12 to T14, data flows in accordance with flow (1) shown in FIG. 2.

[Time T13] The user carries out an operation to enter a request to the image-taking apparatus 100 as a request to start a process to temporarily record data into the RAM 107 at a high-speed screen rate. At that time, data flows in accordance with flow (2) shown in FIG. 2. Thus, pieces of data flow in accordance with both flow (1) and flow (2).

[Time T14] As the RAM 107 becomes full of image data stored therein, the image-taking apparatus 100 automatically stops the photographing and recording processes at the high-speed screen rate and carries out processes to reproduce data from the RAM 107. At that time, the data is output at the rate of 60 fps without discretely reducing the image data obtained as a result of a photographing process carried out at the rate of 240 fps. That is to say, a slow reproduction process is carried out at a reproduction speed equal to ¼ of the ordinary speed. At that time, flow (2) shown in FIG. 2 is ended and data flows in accordance with flow (3).

It is to be noted that an image signal is output by employing the conventional apparatus such as the display processing circuit 108 and the conversion processing section 104 at the rate of 60 fps. Thus, the new function to carry out a photographing process at a high speed can be introduced almost without increasing the cost.

[Time T15] When the user carries out an operation to record the image data onto the optical disk 110, the memory control circuit 106 reads out a moving picture from the RAM 107 and supplies the picture to the compression/decompression circuit 105. The compression/decompression circuit 105 carries out a decompression process on the data of the moving picture and displays a result of the process to the monitor 111 by way of the conversion processing section 104 and the display processing circuit 108. The conversion processing section 104 outputs an image signal to the compression/decompression circuit 109 at the same time. The compression/decompression circuit 109 carries out a compression/coding process adopting the MPEG method on the image signal and records a result of the process onto the optical disk 110.

In the case, for example, the period T13 to T14 is three seconds, 720 frames are obtained as a result of the photographing operation during the three second period T13 to T14 and stored in the RAM 107. Then, in the reproduction process to reproduce data from the RAM 107, data is output at the standard rate of 60 fps. Thus, the period T15 to T16 with a length of 12 seconds is four times the photographing period. When the process to reproduce data from the RAM 107 and the process to record data onto the optical disk 110 are started, data flow (4) shown in FIG. 2 is commenced to enter the states of both data flows (3) and (4).

[Time T16] The image-taking apparatus 100 ends the process to reproduce data from the RAM 107 and the process to record data onto the optical disk 110. At time T16, the image-taking apparatus 100 enters a state of waiting for a photographing operation to be carried out at the high-speed screen rate. At that time, data flows (3) and (4) shown in FIG. 2 are ended while data starts to flow in accordance with flow (1).

[Time T17] The user carries out an operation to enter a request to the image-taking apparatus 100 as a request to change the mode to the standard-rate mode. In accordance with this request, the image-taking apparatus 100 changes the mode to the standard-rate mode and waits in stand by state.

In the operations shown in FIG. 5, after an image obtained as a result of a photographing process carried out at a high-speed screen rate is stored in the RAM 107, in the period T14 to T15, the image is reproduced from the RAM 107 so as to allow the user to confirm the image. Then, if necessary, the user can enter a request to record the data of the image obtained as a result of the photographing process onto the optical disk 110. Thus, it is possible to eliminate time and labor required by the user to carry out an operation to enter a request for deletion of image data, which does not have to be recorded onto the optical disk 110 but has been inadvertently recorded before onto the optical disk 110. In this way, it is possible to provide an effect of improving the utilization efficiency of the storage area of the optical disk 110.

It is to be noted that the RAM 107 employed in the embodiment described above can be replaced with a portable recording medium. In this case, data generated in the high-speed screen rate mode as the data having the JPEG format is directly recorded onto the portable recording medium so that it is possible to view the image taken at a high speed without carrying a compression/coding process to process the data of the image into data in accordance with the MPEG format. In addition, the RAM 107 can be replaced with a memory having a relatively high access speed and a large storage capacity. An example of such a memory is a hard disk. In this case, a long data recording process can be carried out.

On top of that, the present invention can be applied to not only the image-taking apparatus such as a digital video camera and a digital still camera as described above, but also any apparatus having an image-taking function. Examples of the apparatus having an image-taking function are a cellular phone and a PDA (Personal Digital Assistant). In addition, the present invention can also be applied to processing and recording apparatus provided for a signal generated in an image-taking process carried out by using a small-size camera provided for apparatus such as a TV telephone and game software device, which are connected to a PC (Personal Computer).

The invention claimed is:

1. An image-taking apparatus for taking an image by using a solid-state image-taking device, said image-taking apparatus comprising:
   first compression/coding means for receiving the data of an image, which has been taken in an image-taking process at a first screen rate, and carrying out a compression/coding process on said image;
   temporary storage means for temporarily storing the data of an image obtained as a result of a compression/coding process carried out by said first compression/coding means;
   decompression/decoding means for reading out the data of an image taken during a predetermined period of time from said temporary storage means at a second screen rate lower than said first screen rate and carrying out a decompression/decoding process on said image read out from said temporary storage means;
   second compression/coding means for carrying out a compression/coding process on an image obtained as a result of a decompression/decoding process carried out by said decompression/decoding means;
   storage means for storing the data of an image obtained as a result of a compression/coding process carried out by said second compression/coding means;
   display processing means for reading out the data of an image taken during said predetermined period of time from said temporary storage means at said second screen rate and generating an image signal to be displayed; and discrete-reduction means for discretely reducing image data obtained as a result of a photographing process carried out at said first screen rate to output data equivalent to data obtained at said second screen rate and supplying said output data to said display processing means, wherein the size of the image received by the first compression/coding means is adjusted to conform to the specifications of the first compression/coding means and temporary storage means.

2. The image-taking apparatus according to claim 1 wherein, while said second compression/coding means is carrying out a compression/coding process, concurrently with said compression/coding process, said display processing means receives image data being supplied to said second compression/coding means and generates an image signal to be displayed.

3. The image-taking apparatus according to claim 1, said image-taking apparatus further having mode switching means for switching two imaging-taking modes, which serve as modes of taking an image at said first and second screen rates respectively, from any one of said image-taking modes to the other wherein, in said image-taking mode of taking an image at said second screen rate, said second compression/coding means carries out a compression/coding process on image data obtained as a result of a photographing process carried out at said second screen rate and stores a result of said compression/coding process into said storage means.

4. The image-taking apparatus according to claim 1, said image-taking apparatus further having:
 a normal image taking mode of outputting signals of a predetermined number of pixels, which are arranged to form a two-dimensional array, at said second screen rate; and
 a high-speed image taking mode of outputting an image signal at said first screen rate without changing a field angle by simultaneously reading out signals of adjacent pixels selected among said predetermined number of pixels as adjacent pixels having filters of the same color and summing up said pixel signals.

5. The image-taking apparatus according to claim 1 wherein said first compression/coding means carries out a compression/coding process on image data in accordance with a still-image format and said decompression/decoding means carries out a decompression/decoding process on image data in accordance with said still-image format.

* * * * *

UNITED STATES PATENT AND TRADEMARK OFFICE
CERTIFICATE OF CORRECTION

PATENT NO. : 7,705,895 B2
APPLICATION NO. : 11/629927
DATED : April 27, 2010
INVENTOR(S) : Takashi Tsujimura et al.

Page 1 of 1

It is certified that error appears in the above-identified patent and that said Letters Patent is hereby corrected as shown below:

Title Pg, Item (54) Title: please insert a -- - -- between the first occurrence of "Image Taking" in the title;

Title Pg, Item (86) the PCT No.: should read "PCT/JP2006/307036";

In Column 1, In the Title, please insert a -- - -- between the first occurrence of "Image Taking".

Signed and Sealed this
Twenty-sixth Day of April, 2011

David J. Kappos
*Director of the United States Patent and Trademark Office*